(12) United States Patent
Saito

(10) Patent No.: US 12,062,343 B2
(45) Date of Patent: Aug. 13, 2024

(54) IMAGE DISPLAY DEVICE AND CONTROL METHOD

(71) Applicant: SONY SEMICONDUCTOR SOLUTIONS CORPORATION, Kanagawa (JP)

(72) Inventor: Ryosuke Saito, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/906,423

(22) PCT Filed: Mar. 29, 2021

(86) PCT No.: PCT/JP2021/013376
§ 371 (c)(1),
(2) Date: Sep. 15, 2022

(87) PCT Pub. No.: WO2021/210379
PCT Pub. Date: Oct. 21, 2021

(65) Prior Publication Data
US 2023/0197017 A1      Jun. 22, 2023

(30) Foreign Application Priority Data

Apr. 13, 2020  (JP) ................................ 2020-071813

(51) Int. Cl.
*G09G 3/34* (2006.01)
*G02F 1/1335* (2006.01)
(Continued)

(52) U.S. Cl.
CPC ....... *G09G 3/3413* (2013.01); *G02F 1/13355* (2021.01); *G06V 10/60* (2022.01); *H04N 5/74* (2013.01)

(58) Field of Classification Search
CPC .. G09G 3/3413; G02F 1/13355; G06V 10/60; H04N 5/74
See application file for complete search history.

(56) References Cited

U.S. PATENT DOCUMENTS

2009/0135313 A1*  5/2009  Endo ..................... G03B 21/005
                                                             348/E5.142
2016/0373708 A1* 12/2016  Kato ..................... H04N 9/3105

FOREIGN PATENT DOCUMENTS

JP       09-230301 A       9/1997
JP       2002-016951 A     1/2002
(Continued)

OTHER PUBLICATIONS

International Search Report and Written Opinion of PCT Application No. PCT/JP2021/013376, issued on Jun. 15, 2021, 10 pages of ISRWO.

*Primary Examiner* — Kenneth B Lee, Jr.
(74) *Attorney, Agent, or Firm* — CHIP LAW GROUP

(57) ABSTRACT

To provide an image display device capable of remediation of color breakup, and an electronic device including the image display device. An image display device includes: a first display panel whose transmittance or reflectance of light is controlled on the basis of a first video signal; a second display panel whose transmittance or reflectance of light is controlled on the basis of a second video signal; a light irradiation unit configured to irradiate the first display panel with color light according to the first video signal for driving the first display panel, and to irradiate the second display panel with color light according to the second video signal for driving the second display panel; and a control unit configured to generate the first video signal corresponding to first color light that is one among red color light, green color light, and blue color light, and generate the second video (Continued)

signal that causes emission of second color light that brings the first color light close to white light.

18 Claims, 10 Drawing Sheets

(51) Int. Cl.
*G06V 10/60* (2022.01)
*H04N 5/74* (2006.01)

(56) References Cited

FOREIGN PATENT DOCUMENTS

| | | | |
|---|---|---|---|
| JP | 2002-207192 | A | 7/2002 |
| JP | 2004-086159 | A | 3/2004 |
| JP | 2009-069286 | A | 4/2009 |
| JP | 2009-080277 | A | 4/2009 |

* cited by examiner

12,062,343 B2

IMAGE DISPLAY DEVICE AND CONTROL METHOD

CROSS REFERENCE TO RELATED APPLICATIONS

This application is a U.S. National Phase of International Patent Application No. PCT/JP2021/013376 filed on Mar. 29, 2021, which claims priority benefit of Japanese Patent Application No. JP 2020-071813 filed in the Japan Patent Office on Apr. 13, 2020. Each of the above-referenced applications is hereby incorporated herein by reference in its entirety.

TECHNICAL FIELD

The present disclosure relates to an image display device and a control method.

BACKGROUND ART

There is known a so-called field sequential color system that performs an operation of separating a color image on the basis of color components and sequentially displaying the separated red color image, green color image, and blue color image at a high speed. However, in a case where an observing point of an image observer moves in a display screen, color breakup occurs in which colors are separated and visually recognized.

CITATION LIST

Patent Document

Patent Document 1: Japanese Patent Application Laid-Open No. 2002-16951

SUMMARY OF THE INVENTION

Problems to be Solved by the Invention

A problem to be solved by the invention is to provide an image display device and a control method capable of remediation of color breakup.

Solutions to Problems

An image display device according to the present disclosure for achieving the object described above is an image display device including:
  a first display panel whose transmittance or reflectance of light is controlled on the basis of a first video signal;
  a second display panel whose transmittance or reflectance of light is controlled on the basis of a second video signal;
  a light irradiation unit configured to irradiate the first display panel with color light according to the first video signal for driving the first display panel, and to irradiate the second display panel with color light according to the second video signal for driving the second display panel; and
  a control unit configured to generate the first video signal corresponding to first color light that is one among red color light, green color light, and blue color light, and generate the second video signal that causes emission of second color light that brings the first color light close to white light.

The control unit may generate the second video signal that causes cyan color light to be emitted in a case where the first color light is red color light, generate the second video signal that causes yellow color light to be emitted in a case where the first color light is blue color light, and generate the second video signal that causes magenta color light to be emitted in a case where the first color light is green color light.

The control unit may generate video signals corresponding individually to red color light, blue color light, and green color light on the basis of an input signal, and generate the first video signal corresponding to a video signal that causes emission of light with a lowest luminance value, and
  generate the second video signal corresponding to a video signal that causes emission of light with a second lowest luminance value, among the video signals corresponding individually to red color light, blue color light, and green color light.

The control unit may divide an input signal into a first subframe and a second subframe following the first subframe in time series, and generate the first video signal and the second video signal as signals of the first subframe, and
  perform subtraction of a luminance value corresponding to a video signal that causes emission of light with a second highest luminance value from a luminance value corresponding to a video signal that causes emission of light with a highest luminance value among the video signals, to generate a video signal corresponding to a luminance value obtained by the subtraction as one of the first video signal and the second video signal in the second subframe.

The control unit may generate video signals corresponding individually to red color light, blue color light, and green color light on the basis of an input signal, and generate the first video signal corresponding to a video signal that causes emission of light with a highest luminance value, and
  generate the second video signal corresponding to a video signal that causes emission of light with a lowest luminance value, among the video signals corresponding individually to red color light, blue color light, and green color light.

The control unit may divide an input signal into a first subframe and a second subframe following the first subframe in time series, and generate the first video signal and the second video signal as signals of one of the first subframe and the second subframe, and
  perform subtraction of a luminance value corresponding to a video signal that causes emission of light with a lowest luminance value from a luminance value corresponding to a video signal that causes emission of light with a second highest luminance value among the video signals, to generate a video signal corresponding to a luminance value obtained by the subtraction as one of the first video signal and the second video signal in another one of the first subframe and the second subframe.

The light irradiation unit may irradiate the first display panel with color light according to the first video signal, and irradiate the second display panel with color light according to the second video signal.

The light irradiation unit may include a first light source for irradiation of light in a first polarization state and a second light source for irradiation of light in a second polarization state.

The light irradiation unit may further include a light irradiation polarizing beam splitter having: a first incident surface on which light from the first light source is incident;

a second incident surface on which light from the second light source is incident; and an emission surface from which light from the first light source and the second light source is emitted.

The first light source may be a light source corresponding individually to two beams of color light among red color light, green color light, and blue color light, and the second light source may be a light source corresponding individually to: color light except the two beams of color light among red color light, green color light, and blue color light; and one of the two beams of color light.

The first light source may be a light source corresponding individually to red color light, green color light, and blue color light, and the second light source may be a light source corresponding individually to red color light, green color light, and blue color light.

There may be further included a projection unit configured to project, in a superimposed manner, a first image obtained by the first display panel and a second image obtained by the second display panel.

There may be further included a polarizing beam splitter having: a first surface on which light from the light irradiation unit is incident; a second surface and a third surface from which incident light is emitted; and a fourth surface from which light via the first display panel and light via the second display panel are emitted, the first display panel may be disposed so as to face the second surface, and the second display panel may be disposed so as to face the third surface.

Between the second surface of the pre-polarizing beam splitter and the first display panel and between the third surface of the polarizing beam splitter and the second display panel, a predetermined wavelength plate may be disposed.

The light irradiation unit may irradiate the first surface of the polarizing beam splitter with light in the first polarization state and light in the second polarization state, light in the first polarization state may be emitted from the second surface of the polarizing beam splitter, and light in the second polarization state may be emitted from the third surface of the polarizing beam splitter.

The light irradiation unit may further include a light irradiation polarizing beam splitter having: a first incident surface on which light from the first light source is incident; a second incident surface on which light from the second light source is incident; and an emission surface from which light from the first light source and the second light source is emitted.

A control method for an image display device according to the present disclosure for achieving the object described above is a control method for an image display device including:

a first display panel whose transmittance or reflectance of light is controlled on the basis of a first video signal;

a second display panel whose transmittance or reflectance of light is controlled on the basis of a second video signal; and a light irradiation unit configured to irradiate the first display panel with color light according to the first video signal for driving the first display panel, and to irradiate the second display panel with color light according to the second video signal for driving the second display panel, and the control method includes:

generating the first video signal corresponding to first color light that is one among red color light, green color light, and blue color light, and generating the second video signal that causes emission of second color light that brings the first color light close to white light.

MODE FOR CARRYING OUT THE INVENTION

Under various conditions in the present specification, presence of various variations occurring in design or manufacturing is allowed. Furthermore, the drawings used in the following description are schematic. For example, FIG. 1 described later illustrates a structure of an image display device, but does not illustrate a ratio of a width, a height, a thickness, and the like.

First Embodiment

Figure 1:
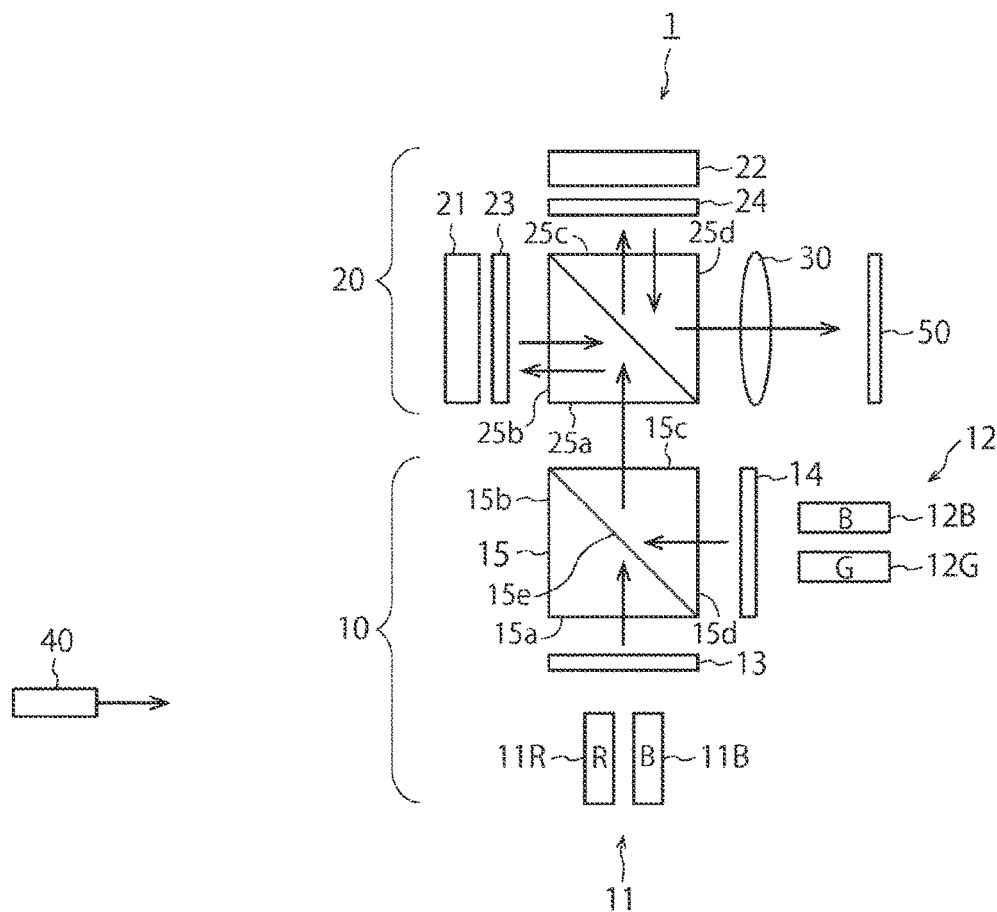
FIG. 1 is a schematic diagram illustrating a configuration example of an image display device according to a first embodiment.

FIG. 1 is a schematic diagram illustrating a configuration example of an image display device according to a first embodiment. An image display device 1 is a device capable of projecting an image on the basis of a video signal, and includes a light irradiation unit 10, a superimposition unit 20, a projection unit 30, and a control unit 40. FIG. 1 further illustrates a screen 50.

The light irradiation unit 10 can emit a plurality of beams of color light, and includes a first light source 11, a second light source 12, polarizing plates 13 and 14, and a light irradiation polarizing beam splitter 15. The first light source 11 includes a red-color light source 11R and a blue-color light source 11B. The second light source 12 includes a green-color light source 12G and a blue-color light source 12B. The second light source 12 is a combination of light sources capable of generating complementary color light of one of the red-color light source 11R and the blue-color light source 11B constituting the first light source 11.

For example, complementary-color light sources of the red-color light source 11R are a blue-color light source and a green-color light source. Similarly, complementary-color light sources of the blue-color light source 11B are a red-color light source and a green-color light source. That is, in the present embodiment, as a complementary-color light source of the red-color light source 11R, the green-color light source 12G and the blue-color light source 12B are included in the second light source 12. Note that, without being limited thereto, a red-color light source 12R and the green-color light source 12G may be included as the second light source 12 as complementary-color light sources of the blue-color light source 11B.

Furthermore, the combination of the first light source 11 is not limited to the red-color light source 11R and the blue-color light source 11B, and may be a combination of a red-color light source and a green-color light source, or a combination of a blue-color light source and a green-color light source. Also in this case, the second light source 12 may be configured as a combination of light sources capable of generating complementary color light of one of the light sources constituting the first light source 11.

The red-color light source 11R and the blue-color light source 11B constituting the first light source 11 are capable of light emission/non-light emission individually. Similarly, the green-color light source 12G and the blue-color light source 12B constituting the second light source 12 also allow individual control of light emission/non-light emission. These are configured by, for example, a semiconductor laser, a light emitting diode, or the like.

The polarizing plate 13 polarizes light irradiated from the first light source 11 into light in a first polarization state, for example, P light (hereinafter, it may be referred to as P light). Furthermore, the polarizing plate 14 polarizes light irradiated from the second light source 12 into light in a second polarization state, for example, S light (hereinafter, it may be referred to as S light).

The light irradiation polarizing beam splitter 15 includes a first incident surface 15a on which light from the first light source 11 is incident, a second incident surface 15d on which light from the second light source 12 is incident, and an emission surface 15c from which light from the first light source 11 and the second light source 12 is emitted. The irradiation polarizing beam splitter 15 further has a surface 15b, which is not involved in light irradiation.

Furthermore, the reference numeral 15e denotes an interface formed by an optical thin film or the like in the light irradiation polarizing beam splitter 15. As described above, between the first light source 11 and the light irradiation polarizing beam splitter 15, the polarizing plate 13 that brings irradiation light into the first polarization state is disposed. Furthermore, between the second light source 12 and the light irradiation polarizing beam splitter 15, the polarizing plate 14 that brings irradiation light into the second polarization state is disposed.

Light (P light) of the first light source 11 via the polarizing plate 13 travels straight through the light irradiation polarizing beam splitter 15, and is emitted from the emission surface 15c. Whereas, light (S light) of the second light source 12 via the polarizing plate 14 is reflected by the interface 15e, and emitted from the emission surface 15c.

The superimposition unit 20 includes a first display panel 21, a second display panel 22, wavelength plates 23 and 24, and a polarizing beam splitter 25. The first display panel 21 and the second display panel 22 are configured by, for example, a reflective display panel such as a liquid crystal on silicon (LCOS, registered trademark). The first display panel 21 is sequentially driven by a video signal corresponding to at least one of a red-color signal or a blue-color signal, which is a color signal corresponding to the red-color light source 11R or the blue-color light source 11B included in the first light source 11. Similarly, the second display panel 22 is sequentially driven by a video signal corresponding to at least one of a green-color signal or a blue-color signal, which is a color signal corresponding to the green-color light source 12G or the blue-color light source 12B included in the second light source 12. The wavelength plates 23 and 24 are $\lambda/4$ plates. Note that the first display panel 21 and the second display panel 22 may be configured by a transmissive display panel.

The polarizing beam splitter 25 includes: a first surface (denoted by reference numeral 25a) on which light from the light irradiation unit 10 is incident; a second surface (denoted by reference numeral 25b) and a third surface (denoted by reference numeral 25c) from which incident light is emitted; and a fourth surface (denoted by reference numeral 25d) from which light via the first display panel 21 and light via the second display panel 22 are emitted. Reference numeral 25e denotes an interface formed by an optical thin film or the like in the polarizing beam splitter 25. The first display panel 21 is disposed so as to face the second surface 25b, and the second display panel 22 is disposed so as to face the third surface 25c. Furthermore, between the second surface 25b of the polarizing beam splitter 25 and the first display panel 21 and between the third surface 25c of the polarizing beam splitter 25 and the second display panel 22, the wavelength plates 23 and 24 are disposed.

The projection unit 30 is, for example, a lens. The projection unit 30 is disposed on the fourth surface side of the polarizing beam splitter 25.

Light (P light) in the first polarization state irradiated from the light irradiation unit 10 is reflected by the interface 25e, and light in the second polarization state travels straight without being reflected. Therefore, the light (P light) in the first polarization state is emitted from the second surface 25b of the polarizing beam splitter 25, and the light (S light) in the second polarization state is emitted from the third surface 25c of the polarizing beam splitter 25.

The light emitted from the second surface 25b of the polarizing beam splitter 25 reaches the first display panel 21 via the wavelength plate 23. The first display panel 21 acts as a light valve, and light whose luminance is controlled according to a video signal is incident on the second surface 25b of the polarizing beam splitter 25 via the wavelength plate 23. This reflected light travels straight in the polarizing beam splitter 25, and is emitted from the fourth surface 25d to form a first image. Furthermore, the light emitted from the third surface 25c of the polarizing beam splitter 25 reaches the second display panel 22 via the wavelength plate 24. The second display panel 22 acts as a light valve, and light whose luminance is controlled according to a video signal is incident on the third surface 25c of the polarizing beam splitter 25 via the wavelength plate 24. This reflected light is reflected by the interface 25e and emitted from the fourth surface 25d to form a second image. Therefore, an image in which the first image and the second image are superimposed is displayed on the screen 50.

The control unit 40 controls the entire image display device 1. The control unit 40 includes, for example, a central processing unit (CPU).

The configuration of the image display device 1 has been described above. Next, a control operation by the control unit 40 of the image display device 1 will be described in detail.

Figure 2:
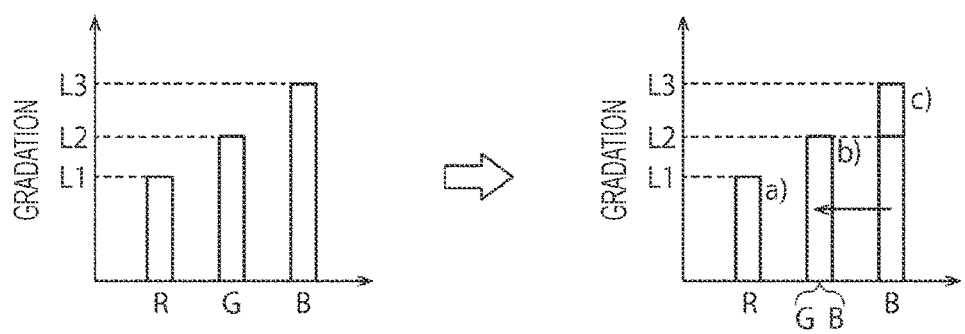
FIG. 2 is a graph for explaining a method of dividing an input signal by a control circuit.

First, a first control operation example will be described with reference to FIGS. 2 to 5. FIG. 2 is a graph for explaining a method of dividing an input signal by the control unit 40. In the left graph, a horizontal axis represents each of red (R), green (G), and blue (B) signals, and a vertical axis represents a gradation. In the right graph, a horizontal axis represents each of red R, green (G), green and blue (G, B), and blue (B) signals, and a vertical axis represents a gradation. (G, B) in the right graph represents a G signal and a B signal. Note that, in the present embodiment, in order to simplify the description, the gradation is assumed to correspond to luminance values of red color light, green color light, and blue color light. For example, the red (R) signal having a gradation L1 causes red color light having a luminance L1 to be emitted from the fourth surface 25d of the polarizing beam splitter 25, the green (G) signal having a gradation L2 causes green color light having a luminance L2 to be emitted from the fourth surface 25d, the blue (B) signal having a gradation L3 causes blue color light having a luminance L3 to be emitted from the fourth surface 25d, and the green and blue (G, B) signals of the gradation L2 cause green color light and blue color light of the luminance L2 to be emitted from the fourth surface 25d. Furthermore, in the present embodiment, any combination of the red (R), green (G), and blue (B) signals is referred to as a video signal.

As illustrated in the left graph of FIG. 2, the control unit 40 divides an input signal into each of the red (R), green (G), and blue (B) signals. Then, as illustrated in the right graph of FIG. 2, the control unit 40 generates the red (R) signal of the gradation L1, the green (G) signal of the gradation L2, the blue (B) signal of the gradation L2, and the blue (B) signal of a gradation (L3−L2). A detailed control method example of the control unit 40 will be described later.

Figure 3:
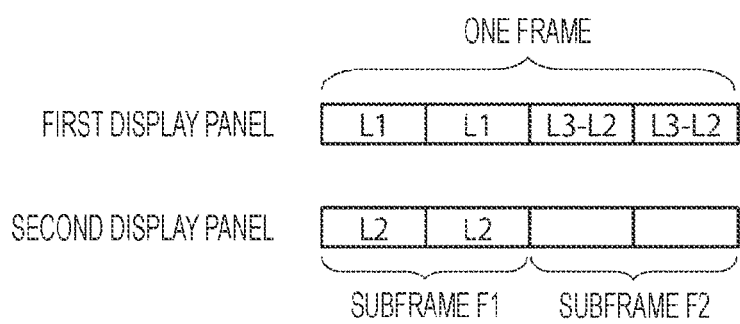
FIG. 3 is a view illustrating an example of a video signal for control of a first display panel and a second display panel.

FIG. 3 is a view illustrating an example of a video signal for control of the first display panel 21 and the second display panel 22. A horizontal axis indicates one frame of an input signal. For example, one frame is 60 hertz. Furthermore, a subframe F1 indicates a first half subframe, and a subframe F2 indicates a second half subframe. Therefore, in a case where a line-of-sight is fixed, a person visually recognizes, in a superimposed manner, light irradiated in the subframe F1 and light irradiated in the subframe F2. For example, when blue color light irradiated in the subframe F1 and green color light irradiated in the subframe F2 have the same luminance, the blue color light and the green color light are visually recognized as cyan color light by the person. Note that, in FIG. 3, each subframe is illustrated as a region divided into two. This illustration indicates individual polarity inversion regions of an applied voltage, since a liquid crystal display element generally requires AC driving.

Furthermore, an upper side indicates a video signal for mainly controlling the first display panel 21, and a lower side indicates a video signal for mainly controlling the second display panel 23. Here, L1 represents a video signal that causes light having a luminance L1 to be emitted from the fourth surface 25d, L2 represents a video signal that causes light having the luminance L2 to be emitted from the fourth surface 25d, and (L3−L2) represents a video signal that causes light having a luminance (L3−L2) to be emitted from the fourth surface 25d.

Figure 4:
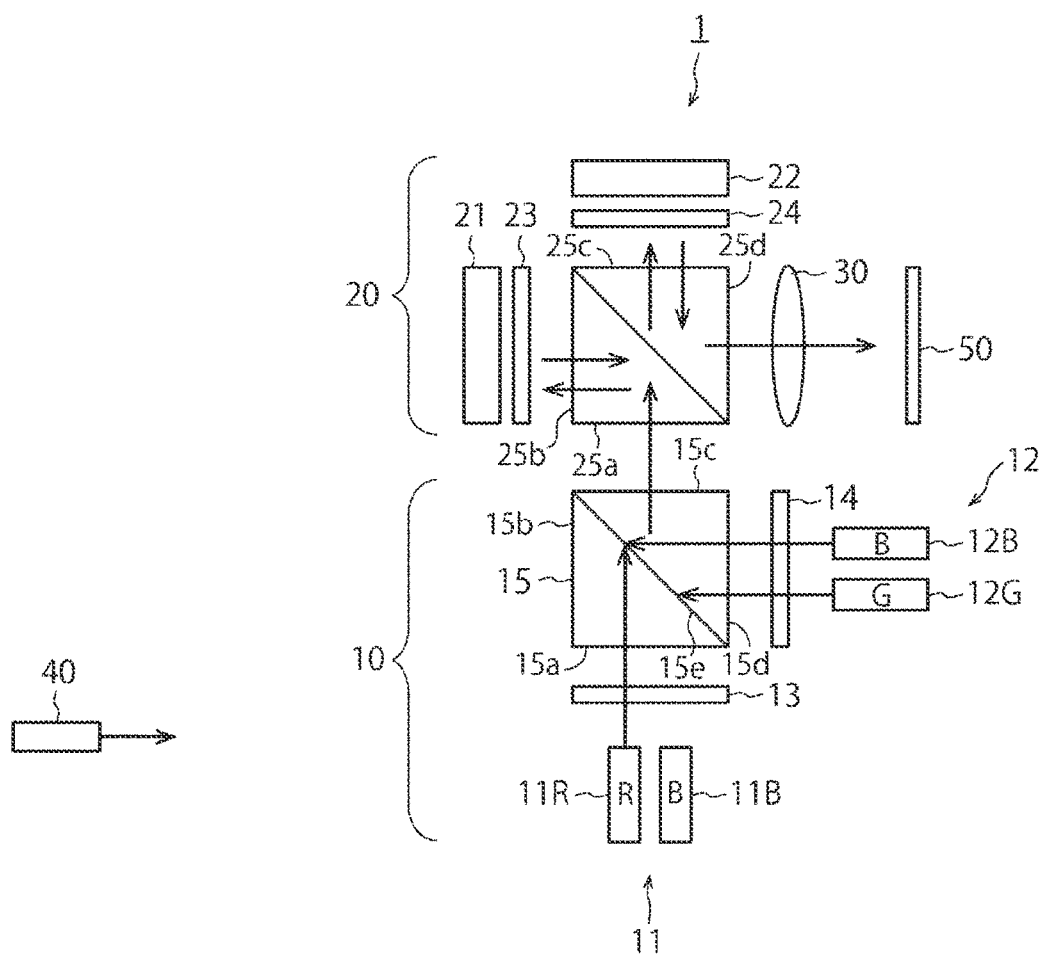
FIG. 4 is a diagram schematically illustrating a light source for irradiation in a first half subframe.
Figure 5:
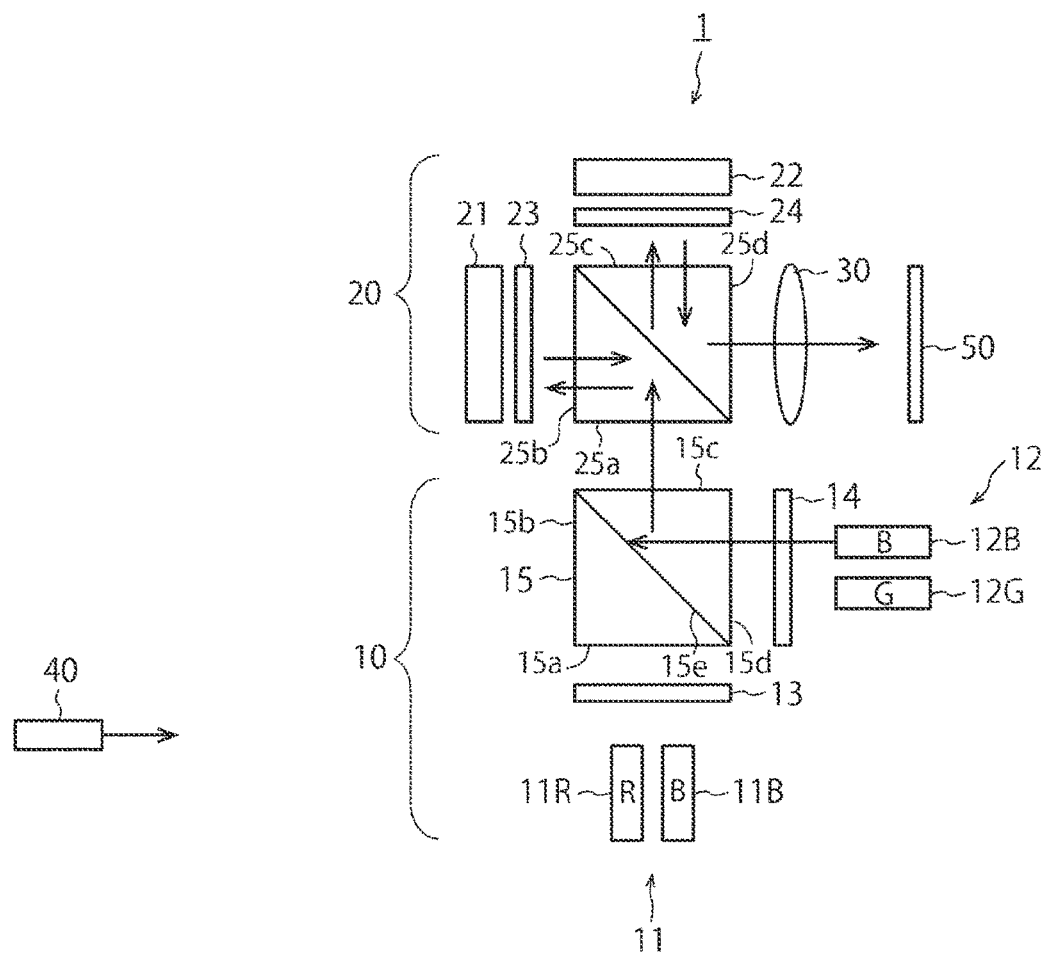
FIG. 5 is a diagram schematically illustrating a light source for irradiation in a second half subframe.

FIG. 4 is a diagram schematically illustrating a light source for irradiation in the subframe F1. FIG. 5 is a diagram schematically illustrating a light source for irradiation in the subframe F2.

The control unit 40 changes a control method between a first control method and a second control method depending on a magnitude relationship of individual gradations of red, green, and blue of an input video signal and whether or not cyan, magenta, and yellow corresponding to complementary colors of these can be generated.

First, the first control method will be described. As illustrated in FIG. 2, the first control method is for a case where it is possible to generate a complementary color subframe for a signal having a smallest gradation among red, green, and blue signals. For example, as illustrated in FIG. 1, in the image display device 1 according to the present embodiment, the second light source 12 includes the green-color light source 12G and the blue-color light source 12B, which can generate complementary color light of red color light corresponding to a red-color signal having a smallest gradation. As a result, the second light source 12 can configure an irradiation period of cyan color light, which is a complementary color subframe of red color light. Here, the complementary color subframe means an irradiation period of complementary color light irradiated by only one of the first light source 11 and the second light source 12. For example, the first light source 11 can emit magenta color light which is complementary color light of green color light, and the second light source 12 can emit cyan color light, which is complementary color light of red color light. Therefore, the image display device 1 according to the present embodiment can provide an irradiation period of each of the magenta color light and the cyan color light as the complementary color subframe. Whereas, in the image display device 1 according to the present embodiment, since yellow color light which is complementary color light of blue color light cannot be irradiated by only one of the first light source 11 and the second light source 12, an irradiation period of the yellow color light cannot be provided as the complementary color subframe.

In the first control method, first, the control unit 40 allocates, to the subframe F1 of the first display panel 21, a video signal L1 corresponding to red (R) color which has a smallest gradation among the three primary colors of red, green, and blue colors. As a result, the first display panel 21 acts as a light valve in accordance with the video signal L1 allocated to the subframe F1. Then, light having a luminance L1 is incident on the second surface 25b of the polarizing beam splitter 25 via the wavelength plate 23. In this case, as illustrated in FIG. 4, in the first light source 11, only the red-color light source 11R emits light.

Whereas, a video signal L2 (a green (G) color signal of a gradation L2 and a blue (B) color signal of the gradation L2) corresponding to green (G) color having a medium gradation is allocated to the subframe F1 of the second display panel 22. As a result, the second display panel 22 acts as a light valve in accordance with the video signal L2 allocated to the subframe F1, and light having a luminance L2 is incident on the third surface 25c of the polarizing beam splitter 25 via the wavelength plate 24. In this case, as illustrated in FIG. 4, in the second light source 12, the green-color light source 12G and the blue-color light source 12B emit light.

As a result, in the subframe F1, red (R) color light having the luminance L1, blue (B) color light having the luminance L2, and green (G) color light having the luminance L2 are projected on the screen 50. Light obtained by superimposing the blue (B) color light having the luminance L2 and the green (G) color light having the luminance L2 is cyan color light, which is complementary color light of the red (R) color light. That is, when the cyan color light and the red (R) color light are superimposed, the light becomes close to white light. As can be seen from this, when the red (R) color light of the luminance L1, the blue (B) color light of the luminance L2, and the green (G) color light of the luminance L2 are superimposed, the red (R) color light having the luminance L1 and the cyan color light having the luminance L1 bring light close to white light, and the cyan color light corresponding to the luminance (L2−L1) becomes a main color component. In this way, in the subframe F1, the cyan color light, which is complementary color light that causes the red (R) color light to be white light, is simultaneously emitted. In this case, since the luminance L2 of the cyan color light is larger than the luminance L1 of the red (R) color light, color breakup of the red (R) color light component can no longer be visually recognized.

Next, the control unit 40 allocates, to the subframe F2 of the first display panel 21, a video signal (a blue (B) color signal of a gradation (L3−L2)), which is a difference between a gradation L3 of blue (B) color light having a largest gradation and the gradation L2 of green (G) color light having a medium gradation. As a result, the first display panel 21 acts as a light valve in accordance with the video signal (L3−L2) allocated to the subframe F2, and light having a luminance (L3−L2) is incident on the second surface 25b of the polarizing beam splitter 25 via the wavelength plate 23. In this case, as illustrated in FIG. 5, in the first light source 11, only the blue-color light source 12B emits light. That is, in the subframe F2, blue color light having the luminance (L3−L2) is projected on the screen 50. As can be seen from these, a total value of the luminance of the red color light in one frame is L1, a total value of the luminance of the green color light is L2, and a total value of the luminance of the blue color light is L3.

It is known that a human feels a great sense of discomfort when a color farthest from chromaticity of a display color, for example, red for a blue-green-based color and blue for a red-green-based color appear with color breakup. Such a phenomenon is referred to as a color breakup (color break) phenomenon.

In the example of FIG. 2, a dominant color is a blue-green-based color. In the present embodiment, in the subframe F1, cyan (a combination of green color light and blue color light) color light, which is complementary color light having the luminance L2, is simultaneously emitted with red color light having the luminance L1, so that red color light having the luminance L1 is suppressed. As a result, the person is prevented from feeling color breakup even if a line-of-sight is moved. Note that the order of the subframe F1 and the subframe F2 may be reversed.

Figure 6:
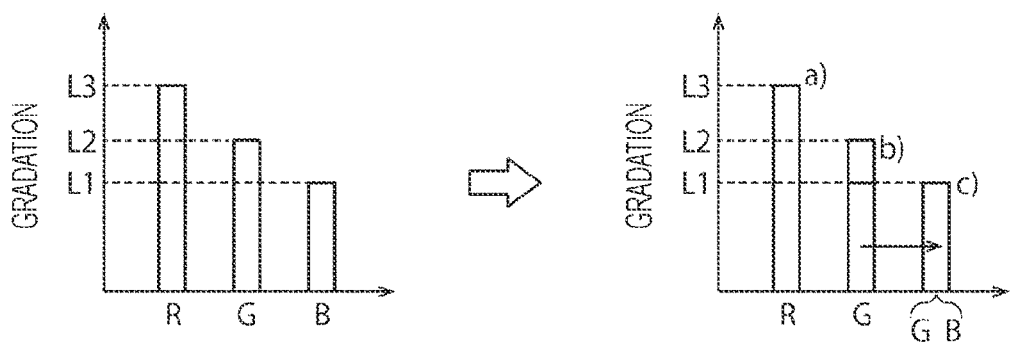
FIG. 6 is a graph for explaining a method of dividing an input signal by a second control method.

Next, the second control method will be described with reference to FIGS. 6 to 9. FIG. 6 is a graph for explaining a method of dividing an input signal by the second control method. In the left graph, a horizontal axis represents each of red (R), green (G), and blue (B) signals, and a vertical axis represents a gradation. In the right graph, a horizontal axis represents each of red R, green G, and green and blue (G, B) signals, and a vertical axis represents a gradation. (G, B) in the right graph represents a G signal and a B signal.

Figure 7:
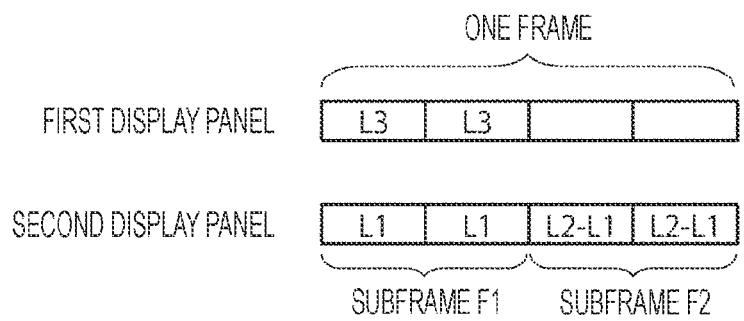
FIG. 7 is a view illustrating an example of a video signal for control of the first display panel and the second display panel.

FIG. 7 is a view illustrating an example of a video signal for control of the first display panel 21 and the second display panel 22. A horizontal axis indicates one frame of an input signal. A subframe F1 indicates a first half subframe, and a subframe F2 indicates a second half subframe. An upper side indicates a video signal for mainly controlling the first display panel 21, and a lower side indicates a video signal for mainly controlling the second display panel 23.

Figure 8:
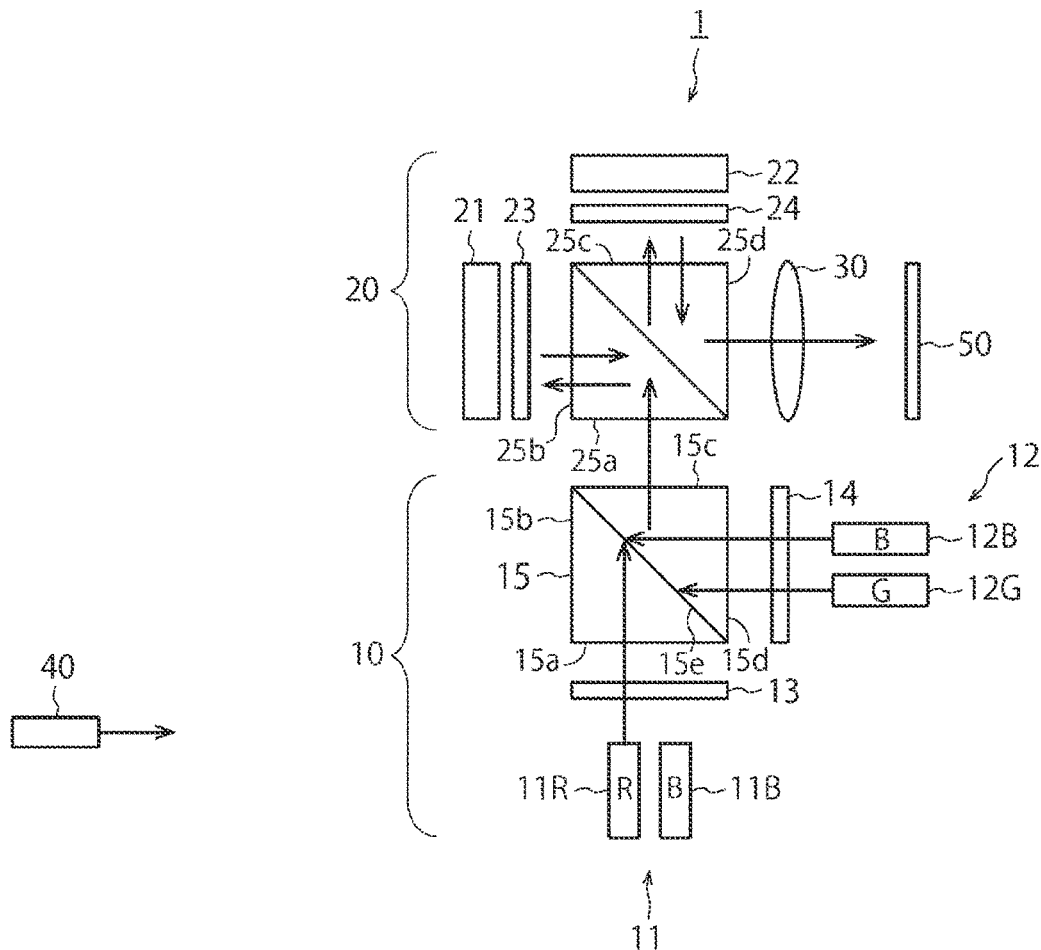
FIG. 8 is a diagram schematically illustrating a light source for irradiation in a first half subframe in the second control method.
Figure 9:
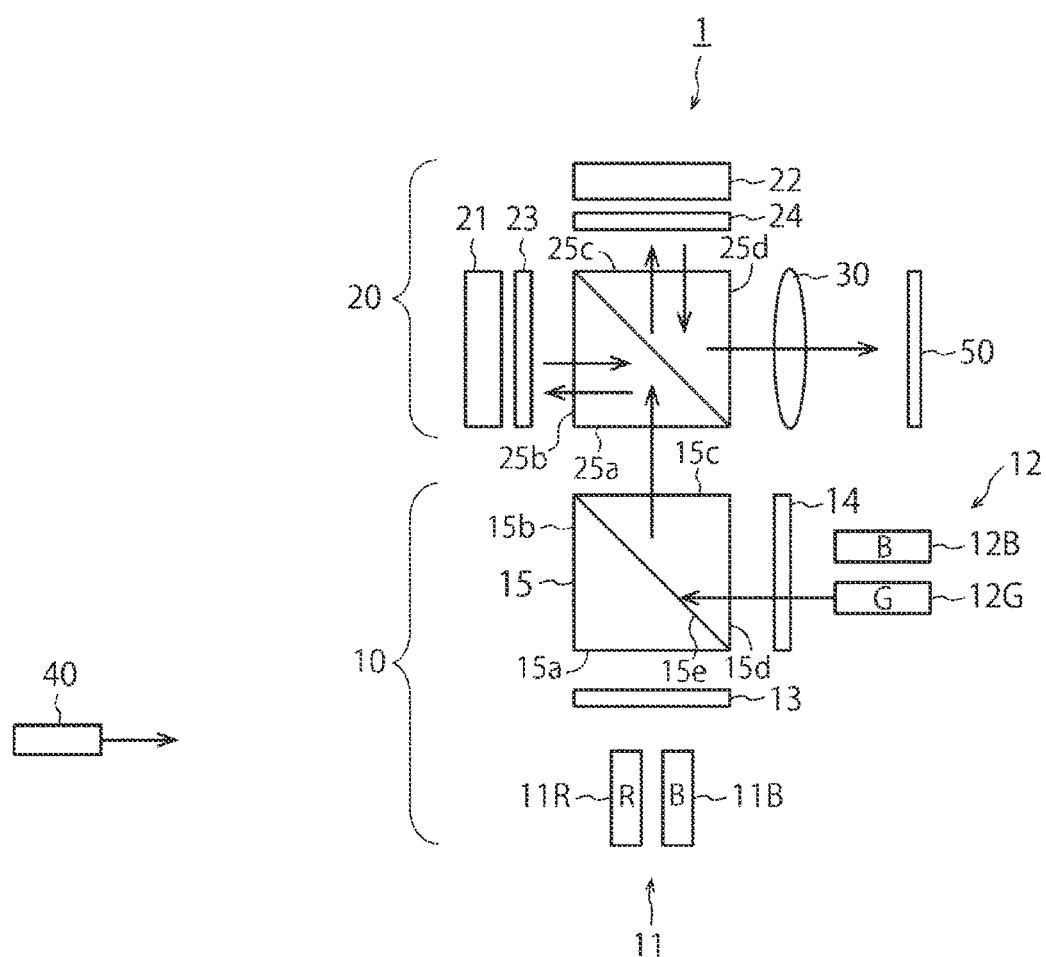
FIG. 9 is a diagram schematically illustrating a light source for irradiation in a second half subframe in the second control method.

FIG. 8 is a diagram schematically illustrating a light source for irradiation in the subframe F1 in the second control method. FIG. 9 is a diagram schematically illustrating a light source for irradiation in the subframe F2 in the second control method.

As illustrated in FIG. 6, the second control method is for a case where a complementary color subframe of blue color for a smallest gradation among red, green, and blue signals cannot be generated. In this case, first, the control unit 40 allocates, to the subframe F1 of the second display panel 22, a video signal L1 (a green (G) color signal of a gradation L1 and a blue (B) color signal of the gradation L1) corresponding to blue (B) color having a smallest gradation L1 among the three primary colors. As a result, the second display panel 22 acts as a light valve in accordance with the video signal L1 allocated to the subframe F2, and light having the luminance L1 is incident on the third surface 25c of the polarizing beam splitter 25 via the wavelength plate 24. In this case, as illustrated in FIG. 8, in the second light source 12, the green-color light source 12G and the blue-color light source 12B emit light.

Whereas, a video signal L3 corresponding to red (R) color having a largest gradation (a red (R) color signal of a gradation L3) is allocated to the subframe F1 of the first display panel 21. As a result, the first display panel 21 acts as a light valve, and light having a luminance L3 is incident on the second surface 25b of the polarizing beam splitter 25 via the wavelength plate 23. In this case, as illustrated in FIG. 8, in the first light source 11, only the red color 11R emits light.

As illustrated in FIG. 6, in the subframe F1, red (R) color of the gradation L3 and cyan color light (a blue (B) color of the gradation L1 and green (G) color of the gradation L1) of the gradation L1 are projected on the screen 50 (FIG. 4). Since the gradation L1 is smaller than the gradation L3, the red (R)-based color is a main color component in the subframe F1.

Next, the control unit 40 allocates, to the subframe F2 of the first display panel 21, a video signal (L2−L1) (a green (G) signal of a gradation (L2−L1)), which is a difference between a gradation L2 of green (G) color having a medium gradation and the gradation L1 of blue (B) color having a smallest gradation. As a result, the second display panel 22 acts as a light valve in accordance with the video signal (L2−L1) allocated to the subframe F2, and light having a luminance (L2−L1) is incident on the third surface 25c of the polarizing beam splitter 25 via the wavelength plate 24. In this case, as illustrated in FIG. 9, in the second light source 12, only the green-color light source 12G emits light. As can be seen from these, a total value of the luminance of the red color light in one frame is L3, a total value of the luminance of the green color light is L2, and a total value of the luminance of the blue color light is L1.

In the example of FIG. 6, red-green-based color is a dominant color. However, in the subframe F1, cyan color light (a combination of green color light and blue color light) which is complementary color light of red color light and has a luminance smaller than that of red color light is simultaneously emitted, so that blue is suppressed. As a result, the person is prevented from feeling color breakup even if a line-of-sight is moved.

As described above, according to the present embodiment, in the first control method, complementary color light (cyan color light) having a luminance larger than that of opposite color light (red color light) is simultaneously emitted with respect to the opposite color light (red color light) for dominant color light (blue-green-based). As a result, the opposite color light is suppressed, which prevents a person from feeling color breakup even if a line-of-sight is moved.

Furthermore, in the second control method, second color light (green color light) having the same luminance as opposite color light (blue color light) is emitted to obtain complementary color light (cyan color light) of first color light (red color light) with respect to the opposite color light (blue color light) for dominant color light (red-green-based color). As a result, complementary color light (cyan color light) having a luminance lower than that of the first color light (red color light) can be emitted simultaneously with the first color light (red color light), and the opposite color light (blue color light) is suppressed, which prevents a person from feeling color breakup even if a line-of-sight is moved.

Second Embodiment

In an image display device 1 according to a second embodiment, each of a first light source 11 and a second light source 12 includes three types of light sources, which is different from the image display device 1 according to the first embodiment in which each of the first light source 11 and the second light source 12 includes two types of light sources. Hereinafter, differences from the image display device 1 according to the first embodiment will be described.

Figure 10:
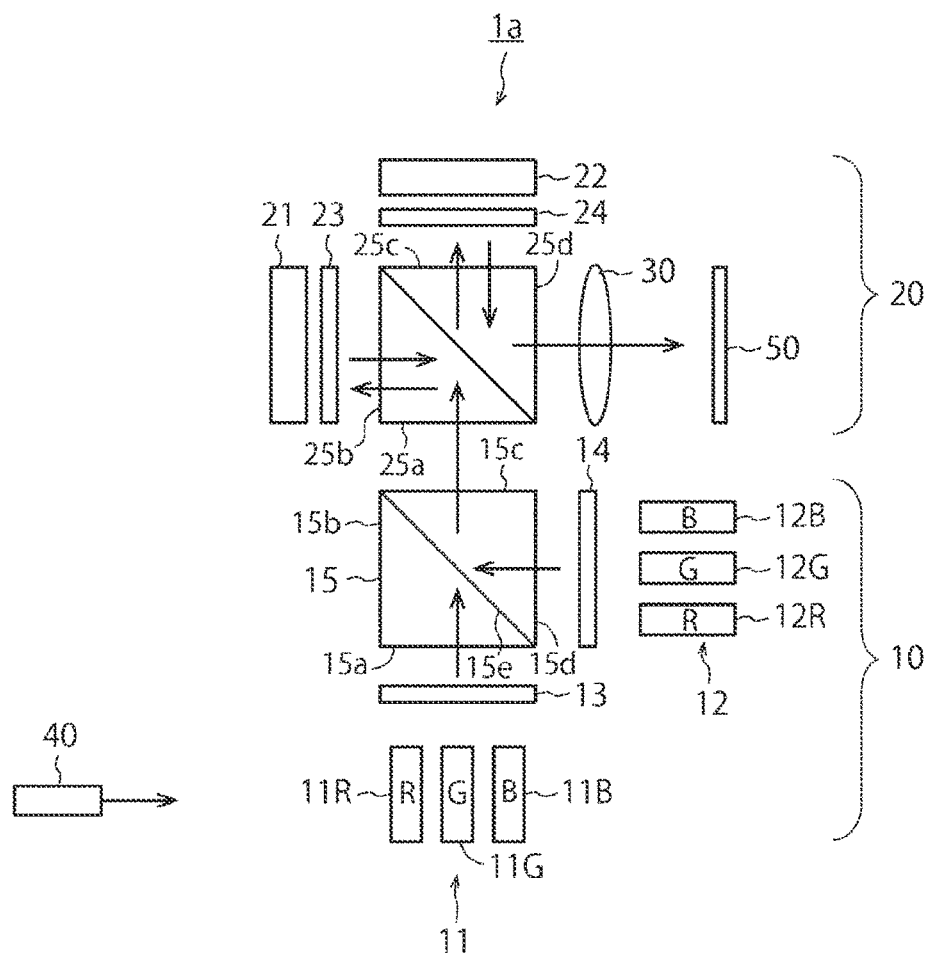
FIG. 10 is a schematic diagram illustrating a configuration example of an image display device according to a second embodiment.

FIG. 10 is a schematic diagram illustrating a configuration example of the image display device 1a according to the second embodiment. The first light source 11 of the image display device 1a includes a red-color light source 11R, a green-color light source 11G, and a blue-color light source 11B. Furthermore, the second light source 13 includes a red-color light source 12R, a green-color light source 12G, and a blue-color light source 12B.

In the image display device 1a according to the second embodiment, a complementary color subframe for each of red color, green color, and blue color can be configured. Therefore, the control unit 40 can generate a complementary color subframe for a smallest gradation among red, green, and blue signals. That is, in the second embodiment, all the control can be performed by a first control method.

Figure 11:
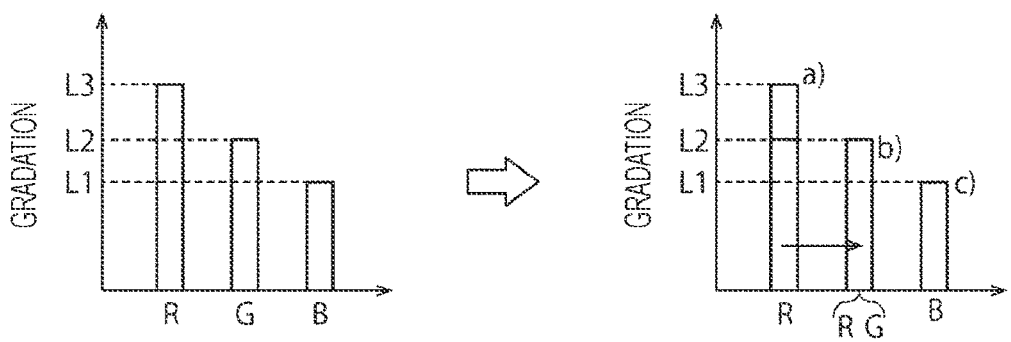
FIG. 11 is a graph for explaining a method of dividing an input signal according to the second embodiment.

Here, the first control method according to the second embodiment will be described with reference to FIGS. 11 to 14. FIG. 11 is a graph for explaining a method of dividing an input signal according to the second embodiment. In the left graph, a horizontal axis represents each of red (R), green (G), and blue (B) signals, and a vertical axis represents a gradation. In the right graph, a horizontal axis represents each of red R, red and green (R, G), and blue B signals, and a vertical axis represents a gradation. (R, G) in the right graph represents an R signal and a G signal. Note that FIG. 11 is an input signal equivalent to that in FIG. 6.

Figure 12:
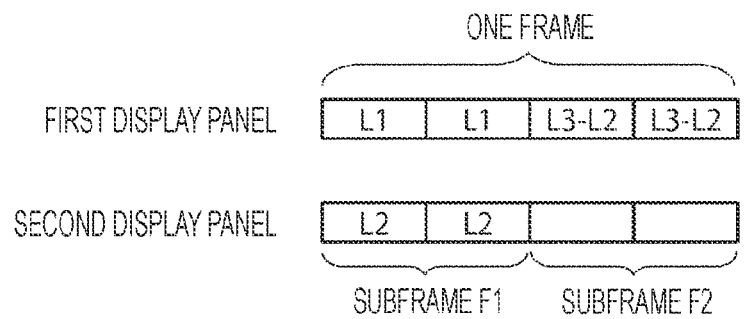
FIG. 12 is a view illustrating an example of a video signal for control of a first display panel and a second display panel according to the second embodiment.

FIG. 12 is a view illustrating an example of a video signal for control of a first display panel 21 and a second display panel 22 according to the second embodiment. A horizontal axis indicates one frame of an input signal. A subframe F1 indicates a first half subframe, and a subframe F2 indicates a second half subframe. An upper side indicates a video signal for mainly controlling the first display panel 21, and a lower side indicates a video signal for mainly controlling the second display panel 23.

Figure 13:
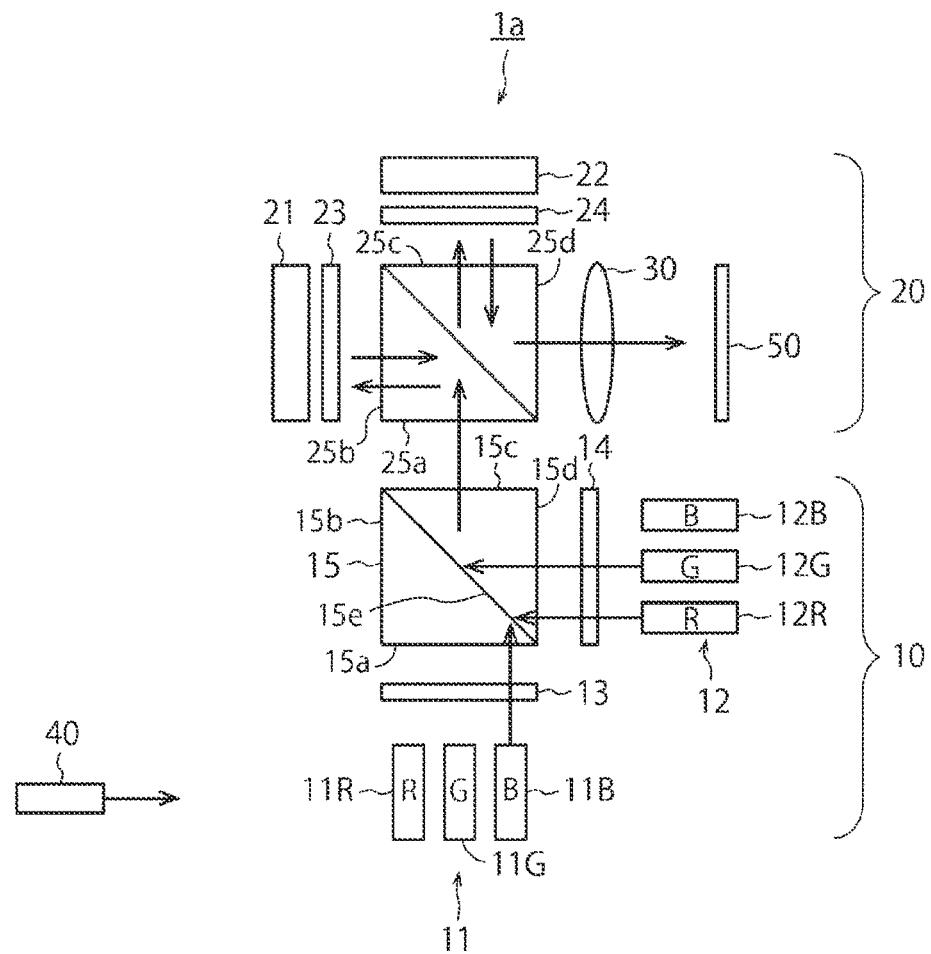
FIG. 13 is a diagram schematically illustrating a light source for irradiation in a first half subframe according to the second embodiment.
Figure 14:
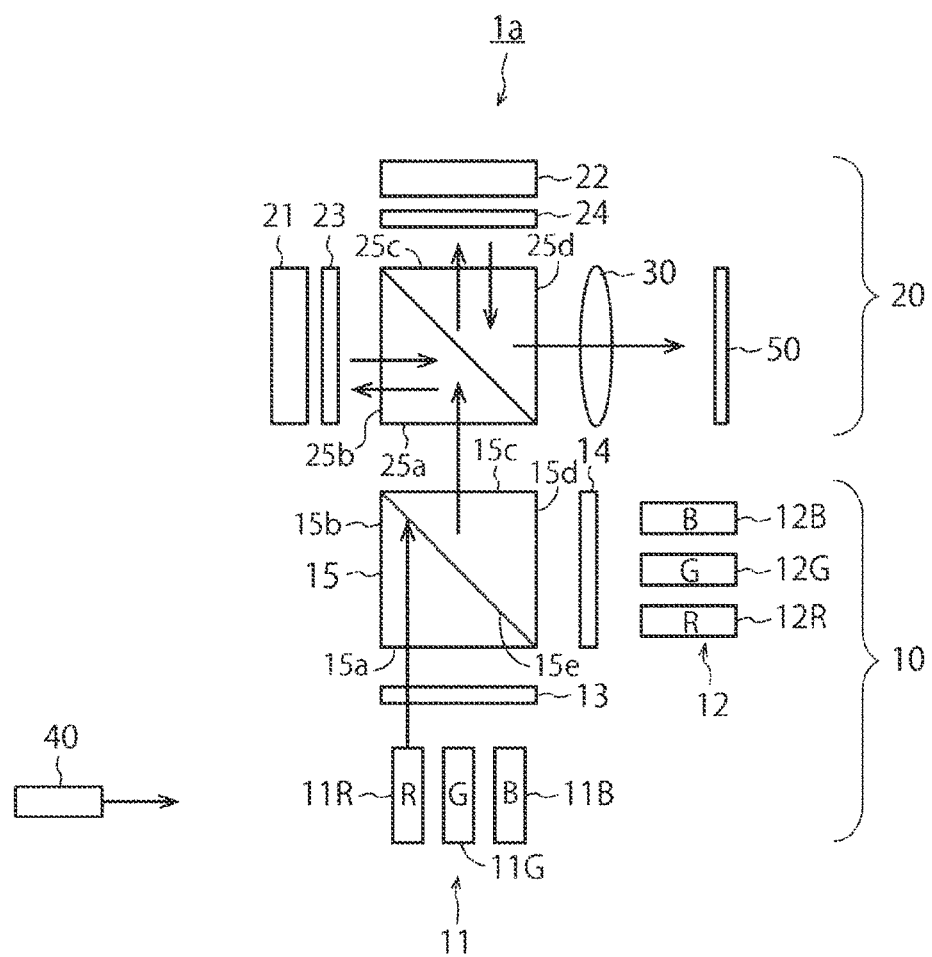
FIG. 14 is a diagram schematically illustrating a light source for irradiation in a second half subframe according to the second embodiment.

FIG. 13 is a diagram schematically illustrating a light source for irradiation in the subframe F1 according to the second embodiment. FIG. 14 is a diagram schematically illustrating a light source for irradiation in the subframe F2 according to the second embodiment.

In the first control method of the second embodiment, first, the control unit 40 allocates, to the subframe F1 of the first display panel 21, a video signal L1 (a blue (B) signal of a gradation L1) corresponding to blue (B) color having a smallest gradation L1 among the three primary colors. As a result, the first display panel 21 acts as a light valve in accordance with the video signal L1 allocated to the subframe F1. Then, light having a luminance L1 is incident on a second surface 25b of a polarizing beam splitter 25 via a wavelength plate 23. In this case, as illustrated in FIG. 13, in the first light source 11, only the blue-color light source 11B emits light.

Whereas, a video signal L2 (a green (G) signal of a gradation L2 and a red (R) signal of the gradation L2) corresponding to green (G) color having a medium gradation is allocated to the subframe F1 of the second display panel 22. As a result, the second display panel 22 acts as a light valve in accordance with the video signal L2 allocated to the subframe F1. Then, light controlled to a luminance L2 is incident on a third surface 25c of the polarizing beam splitter 25 via a wavelength plate 24. In this case, as illustrated in FIG. 13, in the second light source 12, the red-color light source 12R and the green-color light source 12G emit light.

As illustrated in FIG. 11, in the subframe F1, blue (B) color light having the luminance L1, red (R) color light having the luminance L2, and green (G) color light having the luminance L2 are projected on a screen 50. Since the luminance L1 is smaller than the luminance L2, yellow color light, which is a complementary color of the blue (B) color light, is a main color component in the subframe F1.

Next, the control unit 40 allocates, to the subframe F2 of the first display panel 21, a video signal (L3−L2) (a red (R) signal of a gradation (L3−L2)), which is a difference between a gradation L3 of red (R) having a largest gradation and a gradation L2 of green (G) color having a medium gradation. As a result, the first display panel 21 acts as a light valve in accordance with the video signal (L3−L2) allocated to the subframe F2. Then, light controlled to a luminance (L3−L2) is incident on the second surface 25b of the polarizing beam splitter 25 via the wavelength plate 23. In this case, as illustrated in FIG. 14, in the first light source 11, only the red-color light source 12R emits light. That is, in the subframe F2, red color light having the luminance (L3−L2) is projected on the screen 50.

In the example of FIG. 11, red-green-based color is a dominant color. However, in the subframe F1, yellow color light (a combination of red color light and green color light), which is a complementary color of blue color and has a luminance larger than that of blue color light is simultaneously emitted, so that the blue color light is suppressed, which prevents a person from feeling color breakup even if a line-of-sight is moved.

Figure 15:
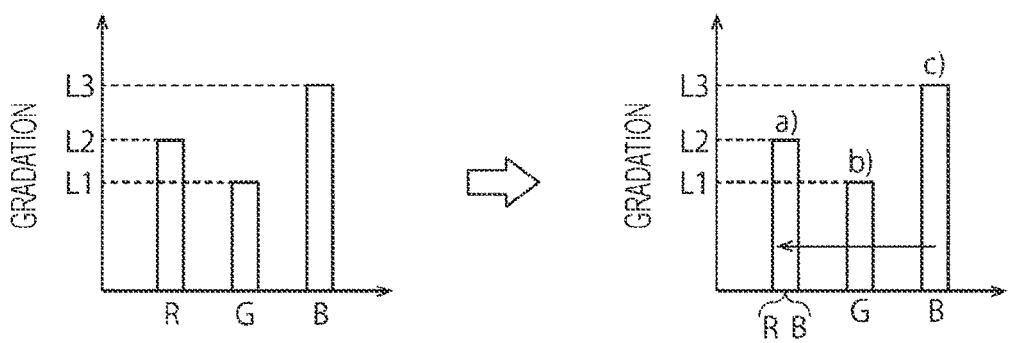
FIG. 15 is a graph for explaining a method of dividing an input signal in a case where a luminance of green (G) color is the lowest.

FIG. 15 is a graph for explaining a method of dividing an input signal in a case where a gradation of green (G) color is the lowest. In the left graph, a horizontal axis represents each of red (R), green (G), and blue (B) signals, and a vertical axis represents a gradation. In the right graph, a horizontal axis represents each of red and green (R, G), green G, and blue B signals, and a vertical axis represents a gradation. (R, G) in the right graph represents an R signal and a G signal.

Figure 16:
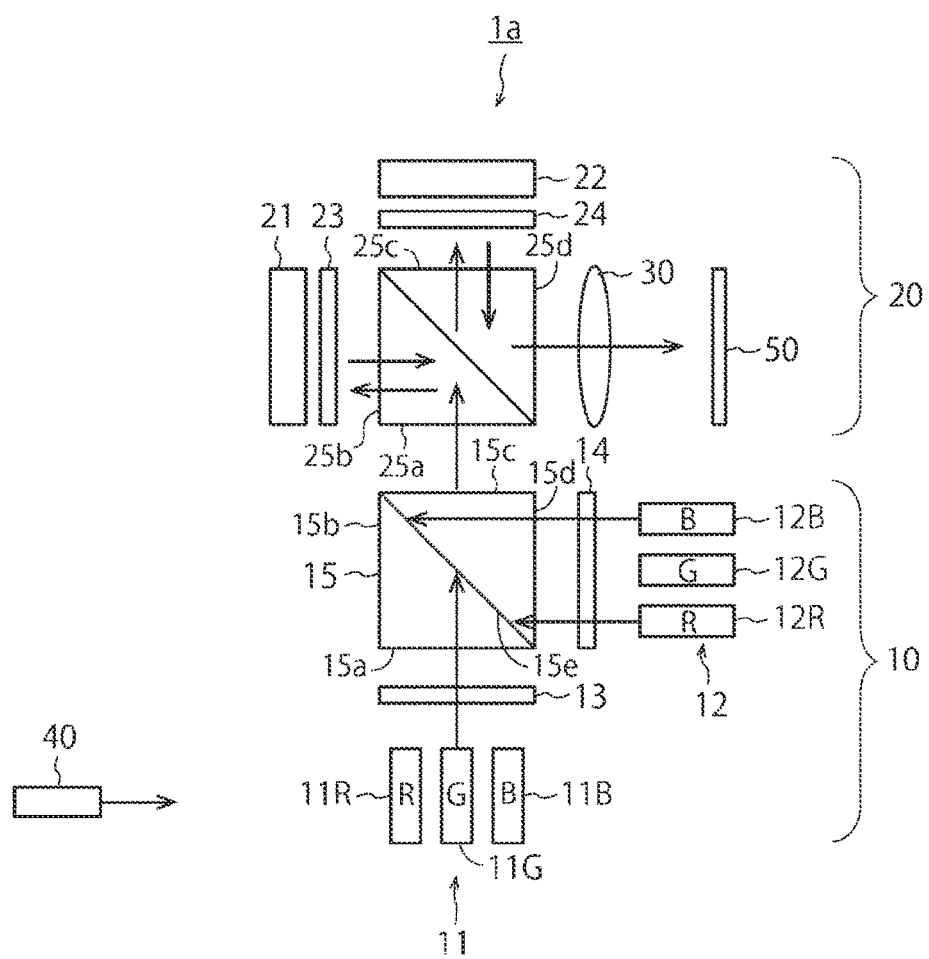
FIG. 16 is a diagram schematically illustrating a light source for irradiation in a subframe in a case where a luminance of green (G) color is the lowest.
Figure 17:
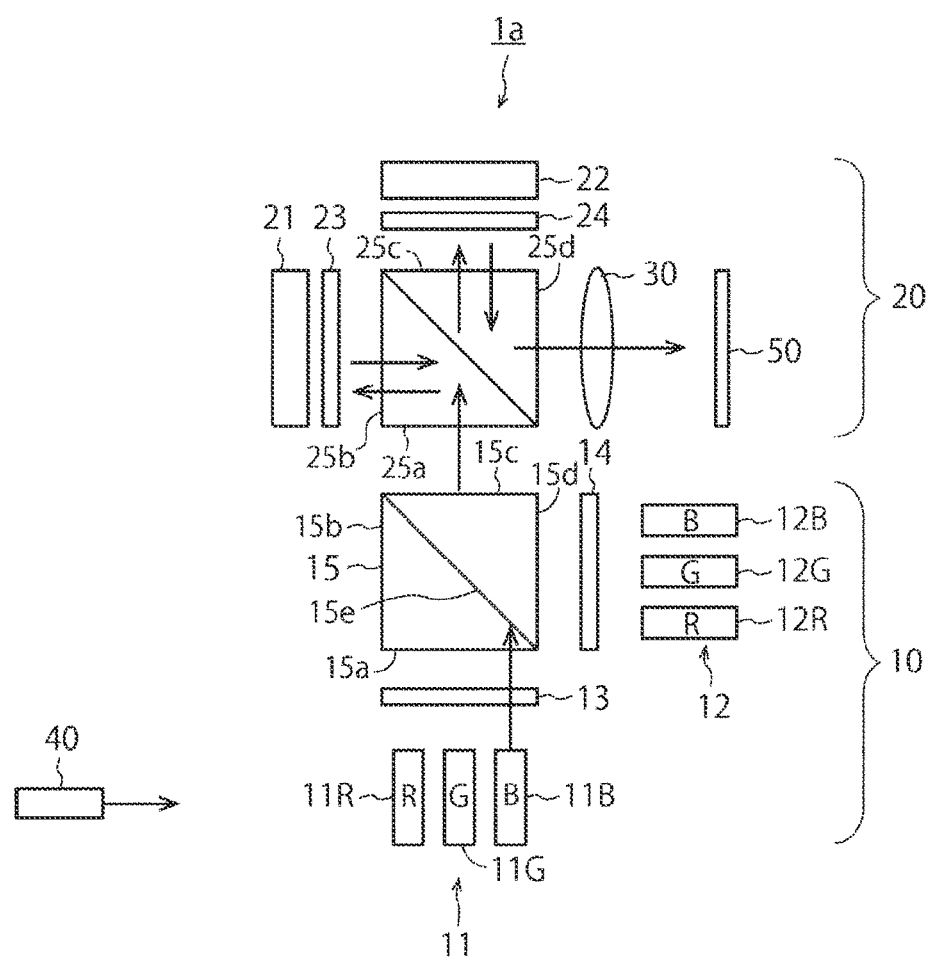
FIG. 17 is a diagram schematically illustrating a light source for irradiation in a second half subframe in a case where a luminance of green (G) color is the lowest.

FIG. 16 is a diagram schematically illustrating a light source for irradiation in the subframe F1 in a case where a gradation of green (G) color is the lowest. FIG. 17 is a diagram schematically illustrating a light source for irradiation in the subframe F2 in a case where a gradation of green (G) color is the lowest.

First, the control unit 40 allocates, to the subframe F1 of the first display panel 21, a video signal L1 (a green (G) color signal of a gradation L1) corresponding to green (G) having a smallest gradation L1 among the three primary colors. As a result, the first display panel 21 acts as a light valve in accordance with the video signal L1 allocated to the subframe F1. Then, light controlled to a luminance L1 is incident on the second surface 25b of the polarizing beam splitter 25 via the wavelength plate 23. In this case, as illustrated in FIG. 16, in the first light source 11, only the green-color light source 11G emits light.

Whereas, a video signal L2 corresponding to red (R) having a medium gradation is allocated to the subframe F1 of the second display panel 22. As a result, the second display panel 22 acts as a light valve in accordance with the video signal L2 (a red (R) signal of a gradation L2 and a blue (B) signal of the gradation L2). Then, light controlled to a luminance L2 is incident on the third surface 25c of the polarizing beam splitter 25 via the wavelength plate 24. In this case, as illustrated in FIG. 16, in the second light source 12, the red-color light source 12R and the blue-color light source 12B emit light.

As illustrated in FIG. 15, in the subframe F1, blue (B) color light having the luminance L1, red (R) color light having the luminance L2, and green (G) color light having the luminance L2 are projected on the screen 50. Since the luminance L1 is smaller than the luminance L2, magenta color light, which is a complementary color light of the green (G) color light, is a main color component in the subframe F1.

Next, the control unit 40 allocates, to the subframe F2 of the first display panel 21, a video signal (L3−L2) (a blue (B) signal of a gradation (L3−L2)) corresponding to a difference between a gradation L3 of red (R) having a largest gradation and a gradation L2 of blue (B) color having a medium gradation. As a result, the first display panel 21 acts as a light valve in accordance with the video signal (L3−L2). Then, light controlled to a luminance (L3−L2) is incident on the second surface 25b of the polarizing beam splitter 25 via the wavelength plate 23. In this case, as illustrated in FIG. 17, in the first light source 11, only the blue-color light source 11B emits light. That is, in the subframe F2, blue color light having the luminance (L3−L2) is projected on the screen 50.

In the example of FIG. 13, since magenta color (a combination of red color and blue color) light which is a complementary color light of green color light and has a luminance larger than that of green color light is simultaneously emitted, the green color light is suppressed. As a result, the person is prevented from feeling color breakup even if a line-of-sight is moved.

As described above, according to the present embodiment, complementary color light having a luminance larger than that of opposite color light is simultaneously emitted with respect to the opposite color light for dominant color light. As a result, the opposite color light is suppressed, which prevents a person from feeling color breakup even if a line-of-sight is moved.

Note that the present technology can have the following configurations.

(1) An image display device including:
a first display panel whose transmittance or reflectance of light is controlled on the basis of a first video signal, and a second display panel whose transmittance or reflectance of light is controlled on the basis of a second video signal;
a light irradiation unit configured to irradiate the first display panel with color light according to the first video signal for driving the first display panel, and to irradiate the second display panel with color light according to the second video signal for driving the second display panel; and
a control unit configured to generate the first video signal corresponding to first color light that is one among red color light, green color light, and blue color light, and generate the second video signal that causes emission of second color light that brings the first color light close to white light.

(2) The image display device according to (1), in which the control unit generates the second video signal that causes complementary color light of the first color light to be emitted as the second color light.

(3) The image display device according to (1) or (2), in which the control unit generates the second video signal that causes cyan color light to be emitted in a case where the first color light is red color light, generates the second video signal that causes yellow color light to be emitted in a case where the first color light is blue color light, and generates the second video signal that causes magenta color light to be emitted in a case where the first color light is green color light.

(4) The image display device according to any one of (1) to (3), in which
the control unit generates video signals corresponding individually to red color light, blue color light, and green color light on the basis of an input signal, and generates the first video signal corresponding to a video signal that causes emission of light with a lowest luminance value, and
generates the second video signal corresponding to a video signal that causes emission of light with a second lowest luminance value, among the video signals corresponding individually to red color light, blue color light, and green color light.

(5) The image display device according to (4), in which
the control unit divides an input signal into a first subframe and a second subframe following the first subframe in time series, and generates the first video signal and the second video signal as signals of the first subframe, and
performs subtraction of a luminance value corresponding to a video signal that causes emission of light with a second highest luminance value from a luminance value corresponding to a video signal that causes emission of light with a highest luminance value among the video signals, to generate a video signal corresponding to a luminance value obtained by the subtraction as one of the first video signal and the second video signal in the second subframe.

(6) The image display device according to any one of (1) to (3), in which
the control unit generates video signals corresponding individually to red color light, blue color light, and green color light on the basis of an input signal, and generates the first video signal corresponding to a video signal that causes emission of light with a highest luminance value, and
generates the second video signal corresponding to a video signal that causes emission of light with a lowest luminance value, among the video signals corresponding individually to red color light, blue color light, and green color light.

(7) The image display device according to (4), in which
the control unit divides an input signal into a first subframe and a second subframe following the first subframe in time series, and generates the first video signal and the second video signal as signals of one of the first subframe and the second subframe, and
performs subtraction of a luminance value corresponding to a video signal that causes emission of light with a lowest luminance value from a luminance value corresponding to a video signal that causes emission of light with a second highest luminance value among the video signals, to generate a video signal corresponding to a luminance value obtained by the subtraction as one of the first video signal and the second video signal in another one of the first subframe and the second subframe.

(8) The image display device according to any one of (1) to (7), in which
the light irradiation unit irradiates the first display panel with color light according to the first video signal, and irradiates the second display panel with color light according to the second video signal.

(9) The image display device according to (8), in which the light irradiation unit includes a first light source for irradiation of light in a first polarization state and a second light source for irradiation of light in a second polarization state.

(10) The image display device according to (9), in which the light irradiation unit further includes a light irradiation polarizing beam splitter having: a first incident surface on which light from the first light source is incident; a second incident surface on which light from the second light source is incident; and an emission surface from which light from the first light source and the second light source is emitted.

(11) The image display device according to (10), in which
the first light source is a light source corresponding individually to two beams of color light among red color light, green color light, and blue color light, and
the second light source is a light source corresponding individually to: color light except the two beams of color light among red color light, green color light, and blue color light; and one of the two beams of color light.

(12) The image display device according to (11), in which
the first light source is a light source corresponding individually to red color light, green color light, and blue color light, and
the second light source is a light source corresponding individually to red color light, green color light, and blue color light.

(13) The image display device according to any one of (1) to (12), further including a projection unit configured to project, in a superimposed manner, a first image obtained by the first display panel and a second image obtained by the second display panel.

(14) The image display device according to any one of (14) to (13), further including a polarizing beam splitter having: a first surface on which light from the light irradiation unit is incident; a second surface and a third surface from which incident light is emitted; and a fourth surface from which light via the first display panel and light via the second display panel are emitted, in which
the first display panel is disposed so as to face the second surface, and
the second display panel is disposed so as to face the third surface.

(15) The image display device according to (14), in which, a predetermined wavelength plate is disposed between the second surface of the pre-polarizing beam splitter and the first display panel and between the third surface of the polarizing beam splitter and the second display panel.

(16) The image display device according to (15), in which
the light irradiation unit irradiates the first surface of the polarizing beam splitter with light in the first polarization state and light in the second polarization state,
light in the first polarization state is emitted from the second surface of the polarizing beam splitter, and
light in the second polarization state is emitted from the third surface of the polarizing beam splitter.

(17) The image display device according to (16), in which the light irradiation unit further includes a light irradiation polarizing beam splitter having: a first incident surface on which light from the first light source is incident; a second incident surface on which light from the second light source is incident; and an emission surface from which light from the first light source and the second light source is emitted.

(18) A control method for an image display device including:
a first display panel whose transmittance or reflectance of light is controlled on the basis of a first video signal;
a second display panel whose transmittance or reflectance of light is controlled on the basis of a second video signal; and
a light irradiation unit configured to irradiate the first display panel with color light according to the first video signal for driving the first display panel, and to irradiate the second display panel with color light according to the second video signal for driving the second display panel, the control method including:
generating the first video signal corresponding to first color light that is one among red color light, green color light, and blue color light, and generating the second video signal that causes emission of second color light that brings the first color light close to white light.

REFERENCE SIGNS LIST 1, 1a Image display device
10 Light irradiation unit
11 Light source (first light source)
11R Red-color light source
11G Green-color light source
11B Blue-color light source
12 Second light source
12R Red-color light source
12G Green-color light source 12B Blue-color light source
13, 14 Polarizing plate
15 Light irradiation polarizing beam splitter
21 First display panel
22 First display panel
23, 24 Wavelength plate
25 Polarizing beam splitter
30 Projection unit
40 Control unit

The invention claimed is:

1. An image display device, comprising:
a first display panel whose transmittance or reflectance of light is controlled based on a first video signal;
a second display panel whose transmittance or reflectance of light is controlled based on a second video signal;
a light irradiation unit configured to irradiate the first display panel with color light based on the first video signal to drive the first display panel, and to irradiate the second display panel with color light based on the second video signal to drive the second display panel;
a polarizing beam splitter comprising:
a first surface on which light from the light irradiation unit is incident;
a second surface and a third surface from which incident light is emitted; and
a fourth surface from which light via the first display panel and light via the second display panel are emitted; and
a control unit configured to generate the first video signal corresponding to first color light that is one of red color light, green color light, and blue color light, and generate the second video signal that causes emission of second color light that brings the first color light close to white light.

2. The image display device according to claim 1, wherein the control unit is further configured to generate the second video signal that causes complementary color light of the first color light to be emitted as the second color light.

3. The image display device according to claim 1, wherein the control unit is further configured to:
generate the second video signal that causes cyan color light to be emitted based on the first color light is the red color light;
generate the second video signal that causes yellow color light to be emitted based on the first color light is the blue color light; and
generate the second video signal that causes magenta color light to be emitted based on the first color light is the green color light.

4. The image display device according to claim 1, wherein the control unit is further configured to:
generate video signals corresponding individually to the red color light, the blue color light, and the green color light based on an input signal, and generate the first video signal corresponding to a video signal that causes emission of light with a lowest luminance value; and
generate the second video signal corresponding to a video signal that causes emission of light with a second lowest luminance value, among the video signals corresponding individually to the red color light, the blue color light, and the green color light.

5. The image display device according to claim 4, wherein the control unit is further configured to:
divide the input signal into a first subframe and a second subframe following the first subframe in time series, and generate the first video signal and the second video signal as signals of the first subframe; and
perform subtraction of a luminance value corresponding to a video signal that causes emission of light with a second highest luminance value from a luminance value corresponding to a video signal that causes emission of light with a highest luminance value among the video signals, to generate a video signal corresponding to a luminance value obtained by the subtraction as one of the first video signal and the second video signal in the second subframe.

6. The image display device according to claim 1, wherein the control unit is further configured to:
generate video signals corresponding individually to the red color light, the blue color light, and the green color light based on an input signal, and generate the first video signal corresponding to a video signal that causes emission of light with a highest luminance value; and
generate the second video signal corresponding to a video signal that causes emission of light with a lowest luminance value, among the video signals corresponding individually to the red color light, the blue color light, and the green color light.

7. The image display device according to claim 4, wherein the control unit is further configured to:
divide the input signal into a first subframe and a second subframe following the first subframe in time series, and generate the first video signal and the second video signal as signals of one of the first subframe and the second subframe; and
perform subtraction of a luminance value corresponding to a video signal that causes emission of light with a lowest luminance value from a luminance value corresponding to a video signal that causes emission of light with a second highest luminance value among the video signals, to generate a video signal corresponding to a luminance value obtained by the subtraction as one of the first video signal and the second video signal in another one of the first subframe and the second subframe.

8. The image display device according to claim 1, wherein the light irradiation unit is further configured to irradiate the first display panel with color light according to the first video signal, and irradiate the second display panel with color light according to the second video signal.

9. The image display device according to claim 8, wherein the light irradiation unit includes a first light source for irradiation of light in a first polarization state and a second light source for irradiation of light in a second polarization state.

10. The image display device according to claim 9, wherein the light irradiation unit further includes a light irradiation polarizing beam splitter that comprises:
a first incident surface on which light from the first light source is incident;
a second incident surface on which light from the second light source is incident; and
an emission surface from which light from the first light source and the second light source is emitted.

11. The image display device according to claim 10, wherein
the first light source is a light source corresponding individually to two beams of color light among the red color light, the green color light, and the blue color light, and the second light source is a light source corresponding individually to:

color light except the two beams of color light among the red color light, the green color light, and the blue color light; and one of the two beams of color light.

12. The image display device according to claim 10, wherein the first light source is a light source corresponding individually to the red color light, the green color light, and the blue color light, and the second light source is a light source corresponding individually to the red color light, the green color light, and the blue color light.

13. The image display device according to claim 1, further comprising a projection unit configured to project, in a superimposed manner, a first image obtained by the first display panel and a second image obtained by the second display panel.

14. The image display device according to claim 1, wherein the first display panel faces the second surface, and the second display panel faces the third surface.

15. The image display device according to claim 14, wherein a specific wavelength plate is between the second surface of the polarizing beam splitter and the first display panel and between the third surface of the polarizing beam splitter and the second display panel.

16. The image display device according to claim 15, wherein the light irradiation unit is further configured to irradiate the first surface of the polarizing beam splitter with light in a first polarization state and light in a second polarization state, light in the first polarization state is emitted from the second surface of the polarizing beam splitter, and light in the second polarization state is emitted from the third surface of the polarizing beam splitter.

17. The image display device according to claim 16, wherein the light irradiation unit further includes a light irradiation polarizing beam splitter comprising:

a first incident surface on which light from a first light source is incident;

a second incident surface on which light from a second light source is incident; and an emission surface from which light from the first light source and the second light source is emitted.

18. A control method, comprising:

in for an image display device that includes:
    a first display panel whose transmittance or reflectance of light is controlled based on a first video signal;
    a second display panel whose transmittance or reflectance of light is controlled based on a second video signal;
    a light irradiation unit configured to irradiate the first display panel with color light according to the first video signal for driving the first display panel, and to irradiate the second display panel with color light according to the second video signal for driving the second display panel; and
    a polarizing beam splitter comprising:
        a first surface on which light from the light irradiation unit is incident;
        a second surface and a third surface from which incident light is emitted; and
    a fourth surface from which light via the first display panel and light via the second display panel are emitted:

generating the first video signal corresponding to first color light that is one of red color light, green color light, or blue color light; and generating the second video signal that causes emission of second color light that brings the first color light close to white light.

* * * * *